(12) United States Patent
Baeza-Yates et al.

(10) Patent No.: US 7,617,208 B2
(45) Date of Patent: Nov. 10, 2009

(54) USER QUERY DATA MINING AND RELATED TECHNIQUES

(75) Inventors: Ricardo Alberto Baeza-Yates, Barcelona (ES); Barbara Poblete, Barcelona (ES)

(73) Assignees: Yahoo! Inc., Sunnyvale, CA (US); University of Chile, Santiago (CL)

( * ) Notice: Subject to any disclaimer, the term of this patent is extended or adjusted under 35 U.S.C. 154(b) by 168 days.

(21) Appl. No.: 11/531,245

(22) Filed: Sep. 12, 2006

(65) Prior Publication Data

US 2008/0065631 A1  Mar. 13, 2008

(51) Int. Cl.
G06F 17/30 (2006.01)
G06F 7/00 (2006.01)
(52) U.S. Cl. .................. 707/6; 707/2; 707/3; 707/5
(58) Field of Classification Search ................. None
See application file for complete search history.

(56) References Cited

U.S. PATENT DOCUMENTS

| | | | | |
|---|---|---|---|---|
| 5,892,917 | A * | 4/1999 | Myerson ............... | 709/224 |
| 6,502,091 | B1 * | 12/2002 | Chundi et al. .......... | 707/3 |
| 6,625,644 | B1 * | 9/2003 | Zaras ................. | 709/217 |
| 7,117,208 | B2 * | 10/2006 | Tamayo et al. .......... | 707/6 |
| 7,231,381 | B2 * | 6/2007 | Li et al. ............. | 707/3 |
| 2003/0046311 | A1 * | 3/2003 | Baidya et al. .......... | 707/200 |
| 2005/0044487 | A1 * | 2/2005 | Bellegarda et al. ...... | 715/511 |

OTHER PUBLICATIONS

Berendt et al., Analysis of navigation behaviour in web sites integrating multiple information systems, The VLDB Journal vol. 9, No. 1 (special issue on "Databases and the Web"). (2000) pp. 56-75.

Srivastava et al., Web Usage Mining: Discovery and Applications of Usage Patterns from Web Data, SIGKDD Explorations, vol. 1, Issue 2, Jan. 2000, pp. 12-23.

Cooley et al, Discovery of Interesting Usage Patterns from Web Data, Department of Computer Science and Engineering University of Minnesota.

Baeza-Yates, Web usage mining in search engines. In: Web Mining: Applications and Techniques, Anthony Scime, editor. Idea Group (2004).

Perkowitz et al., Adaptive web sites: an AI challenge. In: IJCAI (1). (1997).

Mobasher et al., Automatic personalization based on web usage mining. Communication of the ACM vol. 43, No. 8, Aug. 2000, pp. 142-151.

Spiliopoulou, Web Usage Mining for Web Site Evaluation, Communication of the ACM vol. 43, No. 8, Aug. 2000, pp. 127-134.

(Continued)

*Primary Examiner*—Greta L Robinson
*Assistant Examiner*—James J Wilcox
(74) *Attorney, Agent, or Firm*—Weaver Austin Villeneuve and Sampson LLP

(57) ABSTRACT

Methods and apparatus are described for mining user queries found within the access logs of a website and for relating this information to the website's overall usage, structure, and content. Such techniques may be used to discover valuable information to improve the quality of the website, allowing the website to become more intuitive and adequate for the needs of its users.

18 Claims, 6 Drawing Sheets

OTHER PUBLICATIONS

Batista et al., Mining On-line Newspaper Web Access Logs (2002), pp. 1-8.

Cooley et al., WebSIFT: The Web Site Information Filter System, In: KDD Workshop on Web Mining, San Diego, CA, Springer-Verlag in press, Jun. 13, 1999.

Masseglia et al., Using Data Mining Techniques on Web Access Logs to Dynamically Improve Hypertext Structure, ACM SigWeb Letters vol. 8, No. 3 (1999), pp. 1-19.

Huang et al., A Cube Model for Web Access Sessions and Cluster Analysis, In: Proc. of WEBKDD 2001, San Francisco CA, Aug. 2001, pp. 47-57.

Nasraoui et al., An Evolutionary Approach to Mining Robust Multi-Resolution Web Profiles and Context Sensitive URL Associations, International Journal of Computational Intelligence and Applications, vol. 2, No. 3, Jun. 4, 2002, pp. 1-10.

Nasraoui et al., Combining Web Usage Mining and Fuzzy Interence for Website Personalization, In: Proceedings of the WebKDD workshop. (2003), pp. 37-46.

Pei et al., Mining Access Patterns Efficiently from Web Logs, In: Pacific-Asia Conference on Knowledge Discovery and Data Mining, (2000), pp. 396-407.

Perkowitz et al., Adaptive web sites: automatically synthesizing web pages. In: AAAI '98/IAAI '98: Proceedings of the fifteenth national/tenth conference on Artificial intelligence/Innovative applications of artificial intelligence, Menlo Park, CA, USA, American Association for Artificial Intelligence (1998) pp. 727-732.

Xue et al, Log mining to improve the performance of site search. In: WISEW '02: Proceedings of the Third International Conference on Web Information Systems Engineering (Workshop)—(WISEw'02), Washington, DC, USA, IEEE Computer Society (2002), pp. 238.

Baeza-Yates et al., Query Clustering for Boosting Web Page Ranking, In: Atlantic Web Intelligence Conference, Cancun, Mexico, LNCS Springer (2004).

Baeza-Yates et al., Query Recommendation Using Query Logs in Search Engines, In: Web Clustering Workshop at EDBT 2004, Crete, Greece, LNCS Springer (2004).

Kang et al, Query type classification for web document retrieval. In: SIGIR '03: Proceedings of the 26th annual international ACM SIGIR conference on Research and development in information retrieval, New York, NY, USA, ACM Press (2003), pp. 64-71.

Sieg et al., Using concept hierarchies to enhance user queries in web-based information retrieval. In: IASTED International Conference on Artificial Intelligence and Applications (2004).

Radlinski et al., Query Chains: Learning to Rank from Implicit Feedback, ACM 1-59593-135-X/05/0008, Aug. 21-24, 2005.

Davison et al., Finding Relevant Website Queries, In: Poster Proceedings of the Twelfth International World Wide Web Conference, Budapest, Hungary, WWW2003, May 20-24, 2003.

Baeza-Yates, R., Excavando la web (mining the web, original in spanish). El professional de la informacion (The Information Professional), 2004, pp. 4-10.

Cooley et al., Data Preparation for Mining World Wide Web Browsing Patterns, Knowledge and Information Systems 1, Sep. 1998.

Mobasher, B., Web Usage and Personalization, Practical Handbook of Internet Computing, Singh, M.P., Chapman Hall & CRC Press, Baton Rouge, 2004.

Poblete, B., A Web Mining Model and Tool Centered in Queries, MSC in Computer Science, CS Department, University of Chile, Nov. 2004.

Pirolli, P., Computational Models of Information Scent-Following in a Very Large Browsable Text Collection, CHI 97, ACM 0-89791-802-9/97/03, Mar. 22-27, 1997, pp. 3-10.

* cited by examiner

| Class | Concept exists | Results displayed | Visited documents | Significance | Contribution | Affected component |
|---|---|---|---|---|---|---|
| A | yes | yes | DQ ∩ DWS | low | additional IS | anchor text |
| B | yes | yes | DQ \ DWS | high | new IS, add hotlinks | anchor text, links |
| C | yes | yes | ∅ | medium | new content | documents |
| C | yes | no | --- | medium | new IS | anchor text, documents |
| D | no, but it should | no | --- | high | new content | anchor text, documents |
| E | no | no | --- | none | --- | --- |

Figure 3

USER QUERY DATA MINING AND RELATED TECHNIQUES

BACKGROUND OF THE INVENTION

The present invention relates to data mining techniques and, in particular, to techniques for mining user query data.

The Web has been characterized by its rapid growth, massive usage, and its ability to facilitate business transactions. This has created an increasing interest for improving and optimizing websites to fit better the needs of their visitors. It is more important than ever for a website to be found easily on the Web and for visitors to reach effortlessly the content for which they are searching. Failing to meet these goals can mean the difference between success and failure on the Internet.

Web servers typically register important data about the usage of a website. This information generally relates to the navigational behavior of visitors, the queries made to the website's internal search engine (if one is available), and also the queries to external search engines that resulted in requests of documents from the website. Such queries account for a large portion of the visits of most sites on the Web.

Most of the queries related to a website represent actual information needs of the users that visit the site. However, user queries in Web mining have been studied mainly with the purpose of enhancing website search. Techniques are therefore needed which unlock the greater potential of this information.

SUMMARY OF THE INVENTION

According to the present invention, methods and apparatus are provided for mining user query data, website usage data, and website content and structure associated with a website. Documents associated with the website are classified with reference to the website usage data, thereby resulting in a plurality of document classes. User queries represented in the user query data are classified with reference to the website usage data and the document classes, thereby resulting in a plurality of query classes. The user queries associated with at least one of the query classes are evaluated to identify one or more of new anchor text for the website, new content for the website, and new links for the website.

A further understanding of the nature and advantages of the present invention may be realized by reference to the remaining portions of the specification and the drawings.

BRIEF DESCRIPTION OF THE DRAWINGS

FIG. 3 is a table illustrating characteristics of different query classes according to a specific embodiment of the invention.

DETAILED DESCRIPTION OF SPECIFIC EMBODIMENTS

Figures 1A, 1B:
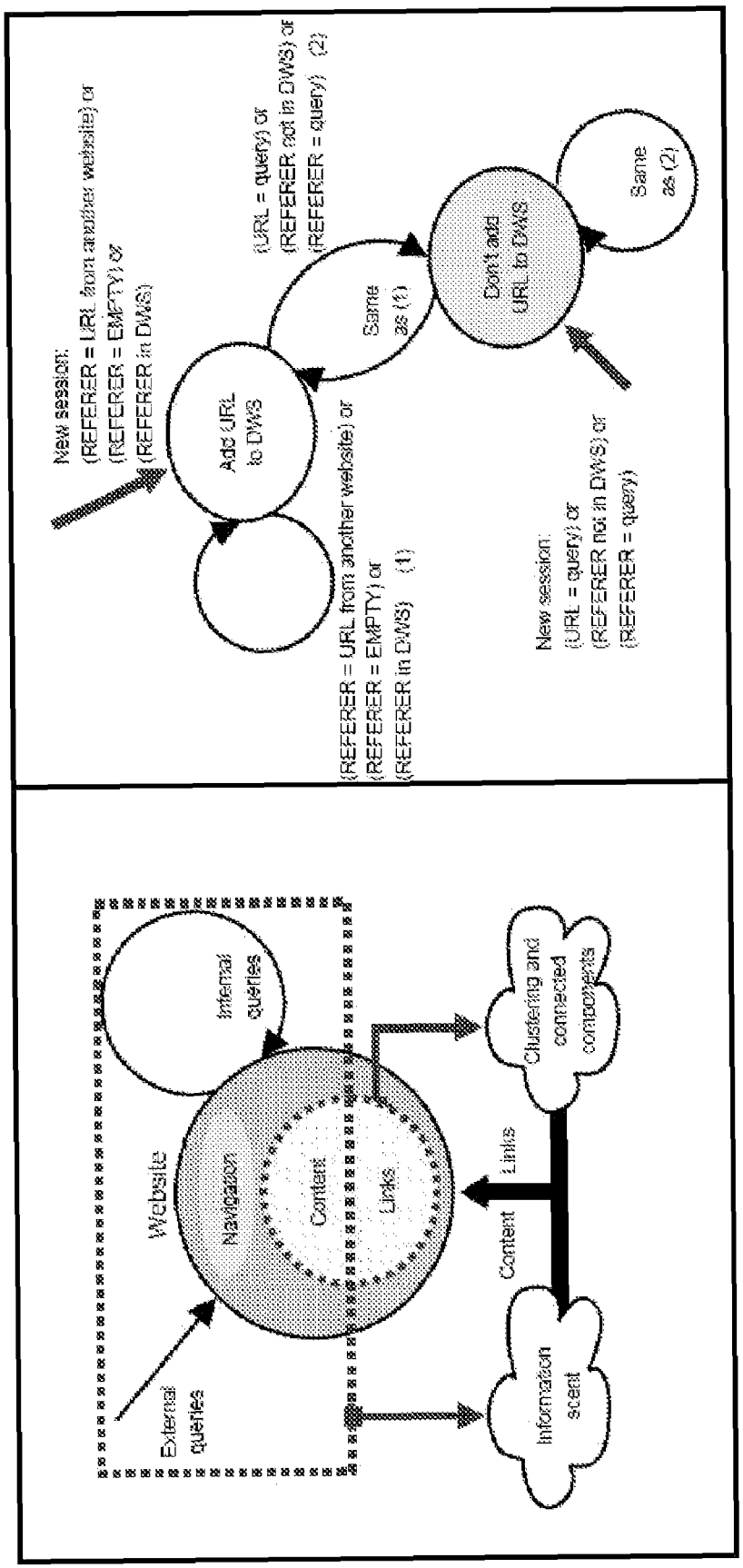
FIG. 1A is a diagram of a model for implementing specific embodiments of the invention.
FIG. 1B is a diagram illustrating a heuristic for classifying documents according to a specific embodiment of the invention.

Reference will now be made in detail to specific embodiments of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims. In the following description, specific details are set forth in order to provide a thorough understanding of the present invention. The present invention may be practiced without some or all of these specific details. In addition, well known features may not have been described in detail to avoid unnecessarily obscuring the invention.

Web mining is the process of discovering patterns and relations in Web data. Web mining generally has been divided into three main areas: content mining, structure mining, and usage mining. Each one of these areas is associated mostly, but not exclusively, with three predominant types of data found in a website:

(1) Content: The real data that the website was designed to give to its users. In general this data comprises mainly text and images in the documents or pages of the site, although other types of content may also be included, e.g., video and audio.

(2) Structure data: This data describes the organization of the content within the website as represented, for example, by the links between documents. This includes the organization inside a Web page, internal and external links, and the site hierarchy.

(3) Usage data: This data describes the use of the website, reflected in the Web server's access logs, as well as in logs for specific applications.

Web usage mining has generated a great amount of commercial interest. The analysis of Web server logs has proven to be valuable in discovering many issues such as, for example, if a document has never been visited it may have no reason to exist, or on the contrary, if a very popular document cannot be found from the top levels of a website, this might suggest a need for reorganization of its link structure.

Previous work has employed Web mining for improving websites. Most of this work focuses on supporting adaptive websites and automatic personalization. Amongst other things, analysis of frequent navigational patterns and association rules based on the pages visited by users has been employed to find interesting rules and patterns in a website. Other research focuses on the modeling of user sessions, profiles, and cluster analysis.

Queries submitted to search engines may include valuable information for improving websites and search engines. Some previous work has been directed at using queries to enhance website search and to make more effective global Web search engines. Some previous work has studied queries to improve the quality of a website. This work includes analyzing similar queries on Web search engines to find new queries that are similar to ones that directed traffic to a website, and to later use this information to improve the website. Similar previous work involves studying queries submitted to a site's internal search engine and analyzing the behavior of users in the website after submitting a query.

Data relating to user queries is provided by visitors to websites implicitly and may be used according to embodiments of the present invention to significantly optimize and/or enhance a website, thus improving the "quality" of that site, i.e., the conformance of the website's structure to the intuition of visitors accessing the site. See Berendt, B., and Spiliopoulou, M., *Analysis of Navigation Behaviour in Web Sites Integrating Multiple Information Systems, VLDB Journal*, Vol. 9, No. 1 (2000), pages 56-75, the entire disclosure of which is incorporated herein by reference for all purposes.

According to specific embodiments of the invention, a model is provided for mining user queries found within the access logs of a website, and for relating this information to the website's overall usage, structure, and content. The aim of this model is to discover valuable information which may be used to improve the quality of the website, thereby allowing the website to become more intuitive and adequate for the needs of its users. This model presents a methodology of analysis and classification of different types of queries registered in the usage logs of a website, including both queries submitted by users to the website's internal search engine and queries from global search engines that lead to documents on the website. As will be shown, these queries provide useful information about topics that interest users visiting the website. In addition, the navigation patterns associated with these queries indicate whether or not the documents in the site satisfied the user's needs.

As mentioned above, in the Web mining context, user queries have been studied mainly with the purpose of enhancing website search, and not with the intention of discovering new data to increase the quality of the website content and structure. By mining queries from website usage logs and appropriately classifying them into different categories (based, for example, on navigational information), embodiments of the present invention take advantage of the differences among these categories with regard to each category's relative importance for discovering new and interesting information about ways to improve the site.

According to various specific embodiments, the information derived from mining user queries may be used to obtain new content to broaden the current coverage of certain topics in a site, suggest changes or additions to words in hyperlink descriptions, suggest new links between related documents, and/or revise links between unrelated documents in a site. As will be understood, any of these outputs may be embodied in reports suggesting or indicating the improvements that can be made to the website. According to some embodiments, the model of the present invention may also be used to generate a visualization of a website's content distribution in relation to the link organization between documents, as well as the URLs selected due to queries.

According to various embodiments of the present invention, a model is provided for mining website usage, content and structure, which is centered on queries. This model enables a variety of mining tasks, using as input a website's access logs, its structure, and the content of its pages. According to specific embodiments, these tasks may also include, among other things, data cleaning, session identification, merging logs from several applications, and removal of robots. The goal is to generate information that will facilitate improvement of the structure and content of a website and, in some cases, evaluation of the interconnections among documents with similar content. Embodiments of the present invention may be applied to different types of websites to determine ways to improve these sites. This includes sites which do not have an internal search engine. The present invention may be particularly useful for large sites on which the content and site structure have become difficult for the site's administrator(s) to manage effectively.

The following concepts are important to define before presenting our model:

Session: A session is a sequence of document accesses registered for one user in the website's usage logs within a maximum time interval between each request. This interval may be set by default (e.g., to 30 minutes), but can be changed to any other value considered appropriate for a particular website. Each user may be identified uniquely by the IP and User-Agent. Alternatively, users may be identified by other mechanisms including, for example, cookies or by explicit registration at the site.

Queries: A query is a set of one or more keywords that are submitted to a search engine and represents an information need of the user generating that query.

Information Scent (IS): indicates how well a word, or a set of words, describe a certain concept in relation to other words with the same semantics. For example, polysemic words (words with more than one meaning) have less IS due to their ambiguity. For more information, please see Pirolli, P., *Computational models of information scent-following in a very large browsable text collection*, CHI. (1997) 3-10, the entire disclosure of which is incorporated herein by reference for all purposes.

For each query that is submitted to a search engine, a page with results is generated. This page has links to documents that the search engine considers appropriate for the query. Review of the brief abstract of each document displayed allows the user to decide if a document is a good match for his query. Based on this review, the user can choose to visit zero or more documents from the results page. According to a specific embodiment, two different types of queries are identified that can be found in a website's access registries.

External queries are queries submitted on Web search engines which resulted in users selecting and visiting documents on a particular website. External queries can be discovered from the log's referrer field.

Internal queries are queries submitted to a website's internal search box. Additionally, external queries that are specified by users for a particular site are considered as internal queries for that site. For example, Google queries that include "site:example.com" are internal queries for the website www.example.com. In the case of internal queries, we can have queries without clicked results.

FIG. 1A provides an illustration of the model according to a specific embodiment in which information about internal and external queries, navigational patterns, and links is gathered for a website to discover Information Scent that can be used to improve the site's content and/or structure. Also the link and content data from the website may be analyzed using clustering of similar documents and connected components. These procedures will be explained in more detail below.

By analyzing the navigational behaviors of users within a website during a period of time or over a number of sessions, the model of the present invention can classify documents into different types such as, for example, documents reached without a search, documents reached from internal queries, and documents reached from external queries. According to a specific embodiment of the invention, documents are defined as follows.

Documents reached Without a Search (DWS) are documents that, throughout the course of a session, were reached by browsing and without the interference of a search initiated with a search engine, either internal or external to the website.

In other words, documents reached from the results page of a search engine and documents attained from those results are not considered in this category. Any document reached from documents visited previous to the use of a search engine will be considered in this category.

Documents reached from Internal Queries (DQi) are documents that, throughout the course of a session, were reached by the user as a direct result of an internal query. Documents reached from External Queries (DQe) are documents that, throughout the course of a session, were reached by the user as a direct result of an external query. For future references we will drop the subscript for DQi and DQe and will refer to these documents collectively as DQ. This is for simplification purposes and should not be used to limit the scope of the invention.

It is important to observe that DWS and DQ are not disjoint sets of documents because in one session a document can be reached using a search engine (therefore belonging to DQ), and in a different session the same document can be reached without using a search engine, e.g., by browsing. The important issue then, is to register how many times each of these different events occur for each document. According to a specific embodiment, we consider the frequency of each event directly proportional to that event's significance for improving a website. The classification of documents into these three categories is important in a particular implementation for discovering useful information from queries in a website.

Documents belonging to DQ sets can be discovered directly by analyzing the referrer URL in an HTTP request to see if it is equal to the results page of a search engine (internal or external). In one embodiment, only the first occurrence of each requested document in a session is classified.

On the other hand, documents in DWS are more difficult to classify due to the fact that backward and forward navigation in the browser's cached history of previously visited documents is not typically registered in web server usage logs. A specific implementation of a heuristic to deal with this issue is illustrated in FIG. 1B. The heuristic is represented by a state diagram that starts a new classification at the beginning of each session and then processes sequentially each request from the session made to the website's server. At the beginning of the classification the set DWS is initialized to the value of the website's start page (or pages). Any documents requested from a document in the DWS set from another website or from an empty referrer (e.g., the case of bookmarked documents) are added to the DWS set.

According to specific embodiments, different types of queries are defined, in part, according to the outcome observed in the user's navigational behavior within the website. That is, queries are classified according to whether the user does or does not to visit the generated results, and whether the query had results in the website. According to a specific embodiment, the classifications can be divided into two main groups: successful queries and unsuccessful queries. Successful queries can include both internal and external queries. However, unsuccessful queries can only correspond to internal queries in that all external queries in the website's usage logs were obviously successful for that site.

If a query submitted during a session had visited results in that same session, we consider it a successful query. There are two types of successful queries referred to herein as A and B. We define classes A and B queries as follows. Class A queries are queries for which the session visited one or more results in the document set AD, where AD contains documents found in the DWS set. In other words, the documents in AD have also been reached, in at least one other session, browsing without use of a search engine.

Class B queries are queries for which the session visited one or more results in the document set BD, where BD contains documents that are only classified as DQ and are not in DWS. In other words documents in BD have only been reached using a search. See FIG. 2A.

The purpose of defining these two classes of queries is that A and B queries contain keywords that can help describe the documents that were reached as a result of these queries. In the case of A queries, these keywords can be used in the text that describes links to documents in AD, thereby contributing additional Information Scent for the existing link descriptions to these documents.

The case of B queries is even more interesting because the words used for B queries apparently describe documents in BD better than the current words used in link descriptions to these documents, i.e., otherwise these documents would also be in DWS. Thus, B queries contribute Information Scent to an even greater degree for BD documents than A queries do for AD documents. Also, the most frequent documents in BD may be considered by a site's administrator as good suggestions of documents that should be reachable from the top levels in the website (this may also be true to a lesser extent for AD documents). Thus, hotlinks may be suggested based on queries rather than navigation as typically the case. It is important to note that the same query can co-occur in class A and class B. What cannot co-occur is the same document in AD and BD! So, according to a specific embodiment, the relevance associated with each type of query is proportional to its frequency in each one of the classes in relation to the frequency of the document in AD or BD.

If a query submitted to the internal search engine did not have visited results in the session that generated it, we will consider it as an unsuccessful query. There are two main causes for this behavior. First, the search engine may have displayed zero documents in the results page because there were no appropriate documents for the query in the website. Alternatively, the search engine may have displayed one or more results, but none of them seemed appropriate from the user's point of view. This can happen when there is poor content or with queries that have polysemic words.

Figures 2A, 2B:
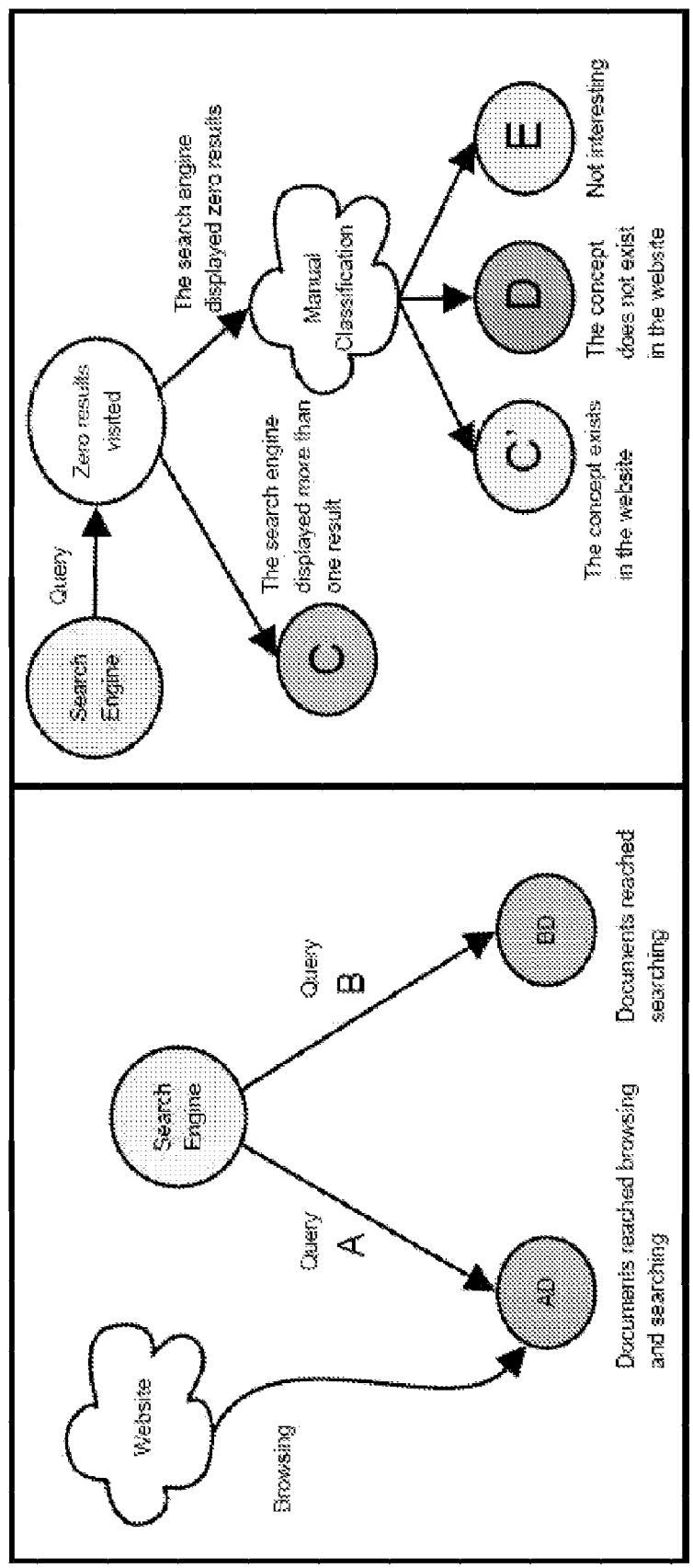
FIGS. 2A and 2B illustrate query classification according to a specific embodiment of the invention.

According to a specific embodiment of the invention, and as illustrated in FIG. 2B, there are four types of unsuccessful queries denoted C, C', D and E. We define these classes of queries as follows. Class C queries are queries for which the internal search engine displayed results, but the user chose not to visit them, most likely because there were no appropriate documents for the user's needs at that moment. This can happen for queries that have ambiguous meanings and for which the site has documents that reflect the words used in the query, but not the concept that the user was looking for. Class C queries represent concepts that should be developed in the content of the website with the meaning that users intended. This may be determined from the keywords of the query.

Class C" queries are queries for which the internal search engine did not display results. This type of query requires a manual evaluation by, for example, the webmaster of the site. If this evaluation establishes that the concept represented by the query exists in the website, but is described with different words, then this is a class C" query. These queries represent words that should be used in the text that describes links and documents that share the same meaning as these queries. This might include queries with misspelled words for which the intended concept exists in the website.

Class D queries are also queries for which the internal search engine did not display results and manual evaluation and classification is required. However, if in this case, the evaluation establishes that the concept represented by the query does not exist in the website, but the evaluator believes that it should appear in the website, then the query is classified as class D. Class D queries represent concepts that should be included in documents in the website because they represent new topics that are of interest to users of the website.

Finally, class E queries are also queries for which there are no results. However, unlike C" and D queries, class E queries are not interesting or relevant for the website and should be omitted in the classification.

Each query class is useful in a different way for improving the website's content and structure. According to a specific implementation, the importance of each query may be considered proportional to that query's frequency in the usage logs, and each type of query is only counted once for every session. The table in FIG. 3 shows a comparison of the different classes of queries.

According to a more specific embodiment, the classification described above may incorporate memory. That is, according to such an approach, an already classified query would not need to be classified in a subsequent iteration. In addition, a simple thesaurus that relates main keywords with its synonyms may be used. According to such an embodiment, an ad-hoc thesaurus may be built for a website over time.

According to various implementations, the present invention may also support the mining of frequent query patterns, text clustering, and structure analysis to complete the information provided by different query classes. According to one such embodiment, all of the user queries are analyzed to discover frequent item sets (or frequent query patterns). This may be done, for example, using LPMiner. Every keyword in a query is considered as an item. The discovered patterns contribute general information about the most frequent word sets used in queries. The patterns are then compared to the number of results given in each case by the internal search engine to indicate if they are answered in the website or not. If the most frequent patterns don't have answers in the website, then it is likely useful to review these patterns to improve the content of the site.

According to another embodiment, a website's documents are clustered according to their text similarity (the number of clusters is a parameter to the model). This may be done to obtain a simple and global view of the distribution of content amongst documents viewed as connected components in clusters, and to compare this to the website link organization. This feature is used to find documents with similar text that don't have links between them, but which should be linked to improve the structure of the website. Text clustering for such an embodiment may be performed using, for example, CLUTO, software for clustering low- and high-dimensional datasets and for analyzing the characteristics of the various clusters.

According to a more specific embodiment, this process generates a visual report which allows the webmaster of the website to evaluate the suggested improvements. It is important to note that we are not implying that all of the documents with similar text should be linked, nor that this is the only criteria by which to associate documents. However, we consider this a useful tool to evaluate in a simple, yet helpful way, the interconnectivity in websites (particularly large ones).

According to yet another embodiment, the clustering results may be additionally correlated with the information about query classification. This enables identification of which documents inside each cluster belong to the AD and BD document sets and the frequency with which these events occur. This supports the idea of adding new groups of documents (i.e., topics) of interest to the top level distribution of content of the website and possibly focusing the website on the most visited clusters. It may also provide information on how documents are reached (e.g., only browsing or searching).

Embodiments are also contemplated which employ information from the classification and/or a thesaurus, as well as the anchor text of links, to improve the text clustering phase. Furthermore, the clustering algorithm may be adapted to automatically establish the appropriate number of clusters and provide a deeper analysis of the most visited clusters. The text clustering phase may also be extended to include stemming.

An exemplary implementation of the present invention for a portal targeted at university students and future applicants will now be described. The site has approximately 8,000 documents, 310,000 sessions, 130,000 external and 14,000 internal queries per month. Using the model described above, reports were generated for four months, two months apart from each other. The first two reports were used to evaluate the website without any changes and show very similar results relative to each other. For the subsequent reports, improvements derived from the model of the present invention were incorporated into the site's content and structure. In this approach, the 20 most significant suggestions from the particular areas of "university admission test" and "new student application" were used. This was done to target an important area in the site and measure the impact of the model's suggestions.

The suggested improvements were made mainly to the top pages of the site and included adding Information Scent to link descriptions, adding new relevant links, and suggestions extracted from frequent query patterns, and class A and B queries. Other improvements included broadening the content on certain topics using class C queries, and adding new content to the site using class D queries. For example the site was improved to include more admission test examples, admission test scores, and more detailed information on scholarships, because these were issues consistently showing up in class C and D queries. To illustrate these results, comparisons between the second and third reports are shown in FIGS. 4, 5, 6A and 6B which show the changes in the website after applying the suggestions. For FIGS. 6A and 6B, the queries studied are only the ones that were used for improvements.

Figure 4:
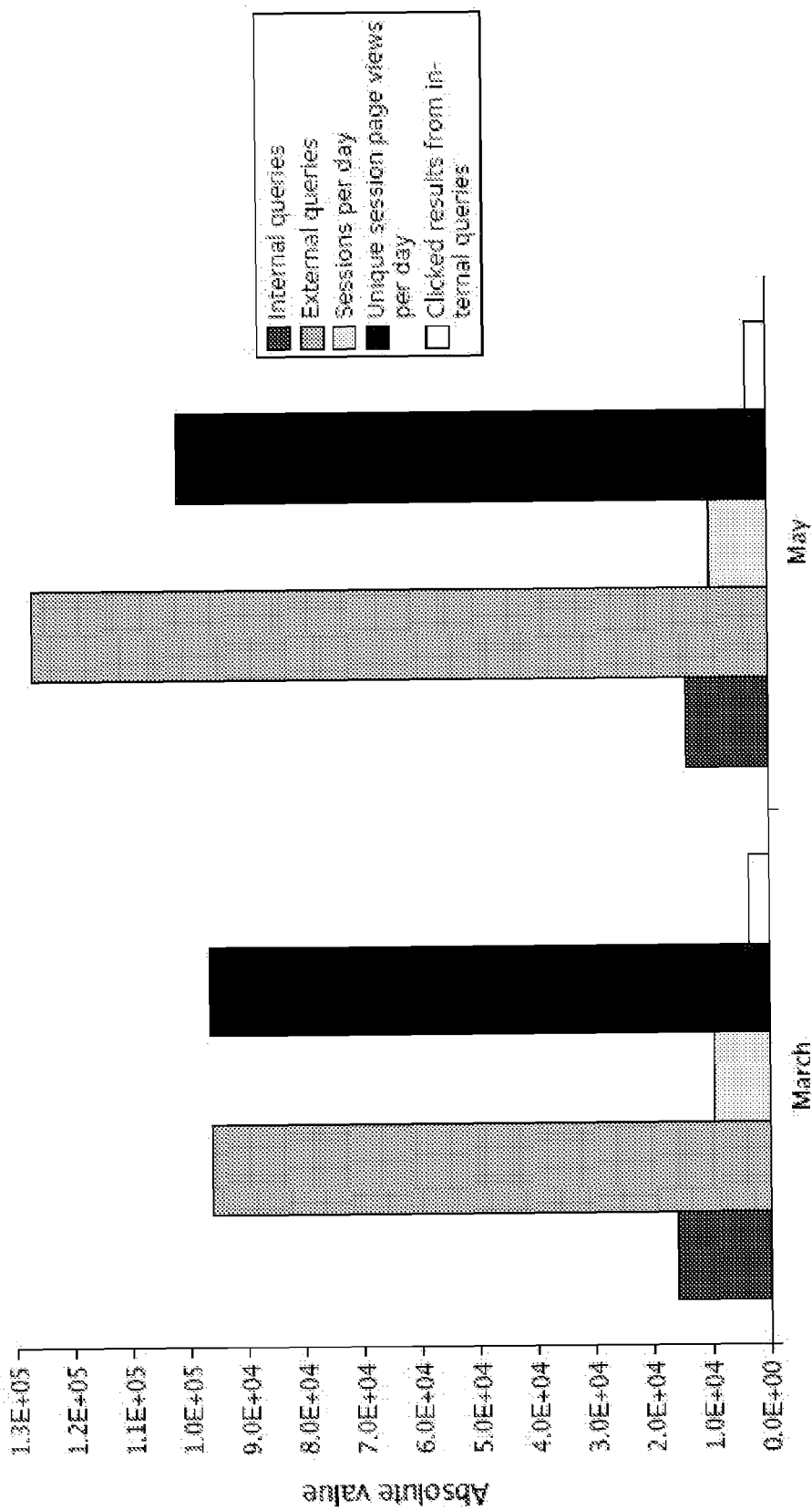
FIG. 4 illustrates the variation in the general statistics of a website before and after application of a specific embodiment of the invention.

FIG. 4 illustrates the variation in the general statistics of the site. After the improvements were made, an important increase in the amount traffic from external search engines was observed (more than 20%), which contributed to an increase in the average number of page views per session per day, and also in the number of sessions per day. The increase in visits from external search engines was due to the improvements in the content and link descriptions in the website validated by the keywords used on external queries. After the improvements were made to the site, we can appreciate a slight decrease in the number of internal queries and clicked documents from those queries. This agrees with the theory that, because content is being found more easily in the website, fewer documents are only accessible through the internal search engine.

Figure 5:
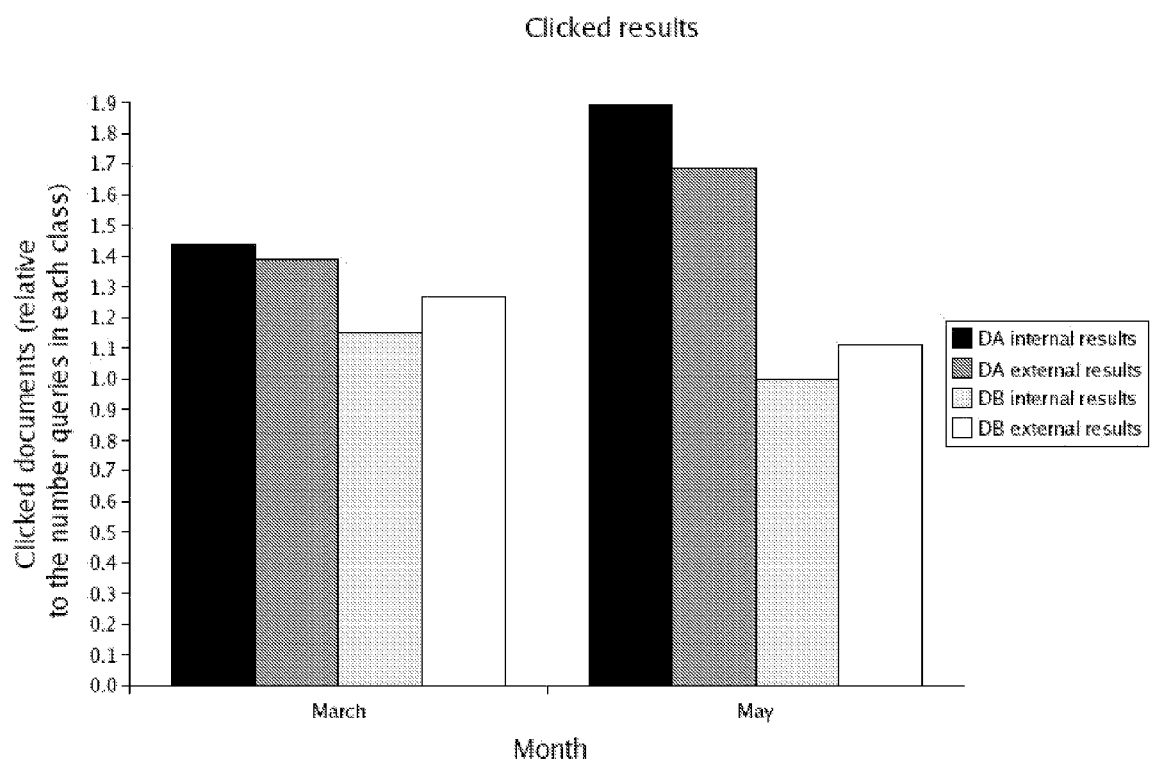
FIG. 5 shows the comparison between the number of documents selected from each of a plurality of query classes relative to the numbers of queries in each class according to a specific embodiment of the invention.
Figures 6A, 6B:
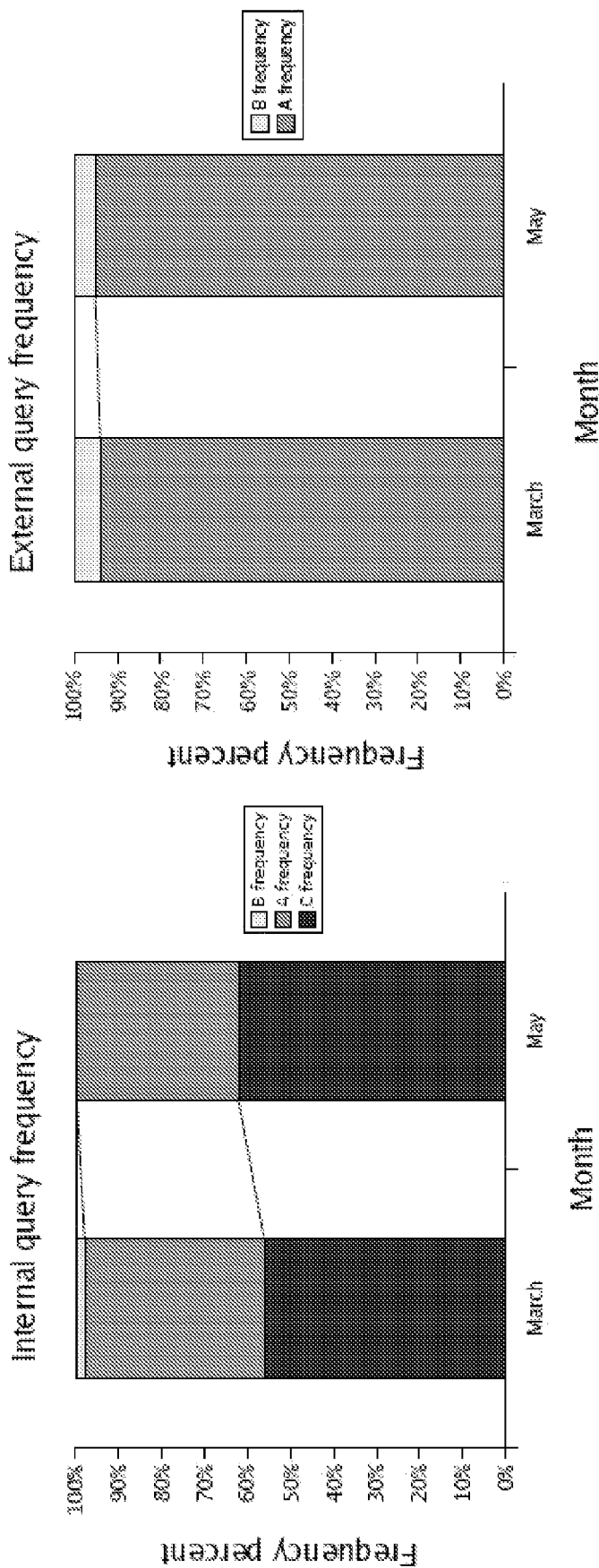
FIGS. 6A and 6B illustrate the distribution of different types of internal and external queries according to a specific embodiment of the invention.

FIG. 5 shows the comparison between the number of documents (i.e., results) clicked from each query class relative to the numbers of queries in each class. External and internal AD documents present an important increase signifying that more external queries are reaching documents in the website, and that those documents are also being increasingly reached by browsing. On the other hand BD documents continue to decrease in every report, validating the hypothesis that the suggested improvements cause fewer documents to be reached only by searching. In FIGS. 6A and 6B, the distribution of A, B, and C queries can be appreciated for internal and external queries. Internal queries (FIG. 6A) show a decrease in the proportion of A and B queries, and an increase in class C queries. For external queries (FIG. 6B) A queries have increased and B queries have decreased, as external queries have become more directed at AD documents.

A specific implementation of a novel website mining model focused on query classification has been described and demonstrated herein. The aim of this model is to find better Information Scent, content, and/or link structure for a website. Embodiments of the present invention enable the discovery, in a very simple and straight forward way, of interesting information for a specific website. For example, class D queries may represent relevant missing topics, products, or services in a website. Even if the document and query classification phase can represent initial overhead, in the long run this overhead becomes almost insignificant as new frequent queries rarely appear. In addition, the analysis performed using this model may be done offline and therefore does not interfere with website personalization. The negative impact is also very low, as this approach does not require dramatic improvements to a website, i.e., incremental improvements result in significant benefits. Another advantage is that this model can be applied to almost any type of website without significant a priori requirements. It may also be used to generate suggestions even where there is no internal search engine in the website.

Evaluation of the model underlying embodiments of the invention has shown that the variation in the usage of the website after incorporation of suggestions for improvement is consistent with the benefits described above. Even though the changes based on these suggestions may be relatively small, they resulted in a significant and persistent increase in website traffic. In the exemplary implementation described above, the most relevant results include a significant increase in traffic generated from external search engines, and a decrease in internal queries. In addition, more documents in the site were reached by browsing and by external queries. In other words, the site became more findable on the Web, and the targeted content was more easily reached by users. As will be understood, even modest improvements in these metrics is highly desirable.

While the invention has been particularly shown and described with reference to specific embodiments thereof, it will be understood by those skilled in the art that changes in the form and details of the disclosed embodiments may be made without departing from the spirit or scope of the invention. For example, embodiments are contemplated which include the development and application of different query ranking algorithms. Embodiments are also contemplated which extend the model described herein to include the origin of internal queries (i.e., from which page on the site the query was issued). In addition, embodiments are contemplated which involve an incremental quantification of the evolution of a website and the different query classes over time.

Embodiments of the invention described herein were implemented using C and Perl (5.8.8 or superior) and a number of Perl modules (e.g., CGI, XML::Parser::Expat, Graph::Directed, Graph::Undirected, URI::Escape, IPC::Open2, Data::TreeDumper, Getopt::Long, Time::Local). However, it should be understood that embodiments of the present invention may be implemented using any of a wide variety of software tools, document formats, libraries, computing paradigms, development environments, and network configurations. Embodiments of the present invention may be embodied as computer program instructions in computer-readable media, as one or more computing devices performing any of the methods described herein, and as one or more computing devices configured to perform the methods described herein. Therefore the present invention should not be limited by references to the specific examples described herein.

Finally, although various advantages, aspects, and objects of the present invention have been discussed herein with reference to various embodiments, it will be understood that the scope of the invention should not be limited by reference to such advantages, aspects, and objects. Rather, the scope of the invention should be determined with reference to the appended claims.

What is claimed is:

1. A computer-implemented method for identifying improvements for a website by mining user query data, website usage data, and website content and structure associated with the website, the method comprising:

classifying documents associated with the website with reference to the website usage data using one or more computing devices configured to classify the documents, thereby resulting in a plurality of document classes, the website usage data corresponding to user interactions with the website recorded in one or more logs associated with the website, the user interactions including document accesses for the documents associated with the website, wherein the plurality of document classes includes a first document class including a first subset of the documents only accessed by browsing during at least one of a plurality of user sessions, and a second document class including a second subset of the documents accessed at least once by one of the queries during at least one of the user sessions, wherein a third subset of the documents is included in both of the first and second subsets;

classifying user queries represented in the user query data with reference to the website usage data and the document classes using the one or more computing devices configured to classify the user queries, thereby resulting in a plurality of query classes, the user query data representing user queries recorded in the one or more logs associated with the website that returned search results including one or more of the documents associated with the website, wherein the plurality of query classes includes:

a first external query class including first ones of the queries from outside of the website which reached third subset documents, a second external query class including second ones of the queries from outside the website which reached second subset documents not included in the third subset, a first internal query class including third ones of the queries from inside the website which yielded search results which were not selected, a second internal query class including fourth ones of the queries from inside the website which did not yield search results and which represent first concepts present in the website content, and a third internal query class including fifth ones of the queries from inside the website which did not yield search results and which represent second concepts not present in the website content, the second concepts having relevance to the website; and evaluating the user queries associated with at least one of the query classes using the one or more computing devices configured to evaluate the user queries to identify one or more of new anchor text to be included in the website, new content to be included in the website, or new links to be included in the website; and storing the new anchor text, the new content, or the new links in memory associated with the one or more computing devices.

2. The computer-implemented method of claim 1 wherein evaluating the user queries comprises evaluating the first queries in the first external query class to identify the new anchor text.

3. The computer-implemented method of claim 1 wherein evaluating the user queries comprises evaluating the second queries in the second external query class to identify one or more of the new anchor text and the new links.

4. The computer-implemented method of claim 1 wherein evaluating the user queries comprises evaluating the third queries in the first internal query class to identify the new content.

5. The computer-implemented method of claim 1 wherein evaluating the user queries comprises evaluating the fourth queries in the second internal query class to identify one or more of the new anchor text and the new content.

6. The computer-implemented method of claim 1 wherein evaluating the user queries comprises evaluating the fifth queries in the third internal query class to identify one or more of the new anchor text and the new content.

7. The computer-implemented method of claim 1 wherein the plurality of query classes comprises a fourth internal query class including sixth ones of the queries from inside the website which did not yield search results and which have substantially no relevance to the website.

8. The computer-implemented method of claim 1 wherein the second document class comprises first documents corresponding to first ones of the queries from outside the website and second documents corresponding to second ones of the queries from inside the website.

9. The computer-implemented method of claim 1 wherein classifying the documents comprises evaluating a referrer field for each document in an access log associated with the website.

10. The computer-implemented method of claim 9 further comprising classifying a selected one of the documents as a member of the first document class where the corresponding referrer field is empty, refers to a document in the first document class, or refers to another website.

11. The computer-implemented method of claim 1 wherein evaluating the user queries comprises identifying a frequent pattern of keywords, determining to what extent the user queries corresponding to the frequent pattern yield results in the website, and identifying the new content with reference to the frequent pattern.

12. The computer-implemented method of claim 1 further comprising forming clusters of the documents based on content similarity, and comparing a distribution of the clusters with a link organization of the website.

13. The computer-implemented method of claim 12 further comprising correlating clustering of the documents with classification of the user queries to determine frequencies with which selected ones of the documents were accessed via queries in different query classes.

14. The computer-implemented method of claim 12 further comprising generating visual representations of the distribution of clusters and the link organization of the web site.

15. A computer program product comprising at least one computer-readable storage medium having computer program instructions stored therein which are operable to cause at least one computing device to identify improvements for a website by mining user query data, website usage data, and website content and structure associated with a website, the computer program instructions comprising:

first instructions operable to classify documents associated with the website with reference to the website usage data, thereby resulting in a plurality of document classes, the website usage data corresponding to user interactions with the website recorded in one or more logs associated with the website, the user interactions including document accesses for the documents associated with the website, wherein the plurality of document classes includes a first document class including a first subset of the documents only accessed by browsing during at least one of a plurality of user sessions, and a second document class including a second subset of the documents accessed at least once by one of the queries during at least one of the user sessions, wherein a third subset of the documents is included in both of the first and second subsets;

second instructions operable to classify user queries represented in the user query data with reference to the website usage data and the document classes, thereby resulting in a plurality of query classes, the user query data representing user queries recorded in the one or more logs associated with the website that returned search results including one or more of the documents associated with the website, wherein the plurality of query classes includes:

a first external query class including first ones of the queries from outside of the website which reached third subset documents, a second external query class including second ones of the queries from outside the website which reached second subset documents not included in the third subset, a first internal query class including third ones of the queries from inside the website which yielded search results which were not selected, a second internal query class including fourth ones of the queries from inside the website which did not yield search results and which represent first concepts present in the website content, and a third internal query class including fifth ones of the queries from inside the website which did not yield search results and which represent second concepts not present in the website content, the second concepts having relevance to the website; and third instructions operable to evaluate the user queries associated with at least one of the query classes to identify one or more of new anchor text to be included in the website, new content to be included in the website, or new links to be included in the website.

16. The computer program product of claim 15 wherein the third instructions are further operable to identify a frequent pattern of keywords, determine to what extent the user queries corresponding to the frequent pattern yield results in the website, and identify the new content with reference to the frequent pattern.

17. The computer program product of claim 15 further comprising fourth instructions operable to form clusters of the documents based on content similarity, and compare a distribution of the clusters with a link organization of the website.

18. The computer program product of claim 17 further comprising fifth instructions operable to correlate clustering of the documents with classification of the user queries to determine frequencies with which selected ones of the documents were accessed via queries in different query classes.

* * * * *